United States Patent [19]

Mendoza-Orozco

[11] 4,046,238

[45] Sept. 6, 1977

[54] FREE-WHEELING MECHANISM FOR BICYCLES

[76] Inventor: Hector Mendoza-Orozco, Adolfo Prieto 1709, Mexico 12, D. F., Mexico

[21] Appl. No.: 655,033

[22] Filed: Feb. 3, 1976

[51] Int. Cl.² ......................................... F16H 15/00
[52] U.S. Cl. ........................................ 192/45; 192/47
[58] Field of Search ................... 192/64, 45, 35, 36, 192/47

[56] References Cited

U.S. PATENT DOCUMENTS

| 1,866,254 | 7/1932 | Eichhorn | 192/64 |
| 2,049,880 | 8/1936 | Winkler | 192/45 |
| 2,211,548 | 8/1940 | Schwinn | 192/64 |
| 2,489,934 | 11/1949 | Schwinn | 192/64 |
| 3,432,015 | 3/1969 | Schwerdhofer | 192/36 |
| 3,539,042 | 11/1970 | Sacchini | 192/36 |
| 3,915,268 | 10/1975 | MacDonald | 192/36 |

*Primary Examiner*—Samuel Scott
*Assistant Examiner*—Allan R. Burke
*Attorney, Agent, or Firm*—Ladas, Parry, Von Gehr, Goldsmith & Deschamps

[57] ABSTRACT

The present invention refers to improvements in a free-wheeling mechanism for bicycles of the kind including two fixed cones and one movable cone, mounted on an axle and so constituted as partially to provide races in which balls run; furthermore, the movable cone includes at one of its end portions a slotted head in which there rest rollers which are guided by a suitable device, which is also connected to the axle; and there is a hub in which the foregoing parts are housed with the exception of the end of the movable cone opposite the end having the slotted head; the improvements are holding means of the guide device which enable same to force the rollers into contact with the hub or prevent their contact therewith, depending on whether the wheel is to run under engagement or to turn freely without pedalling.

4 Claims, 5 Drawing Figures

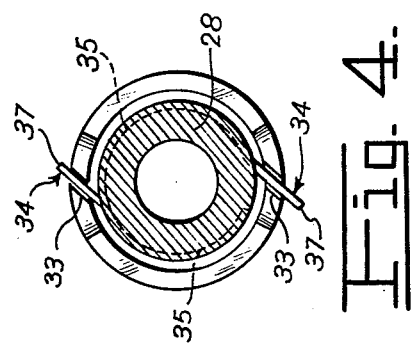
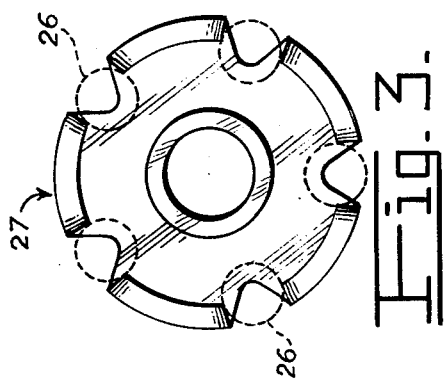
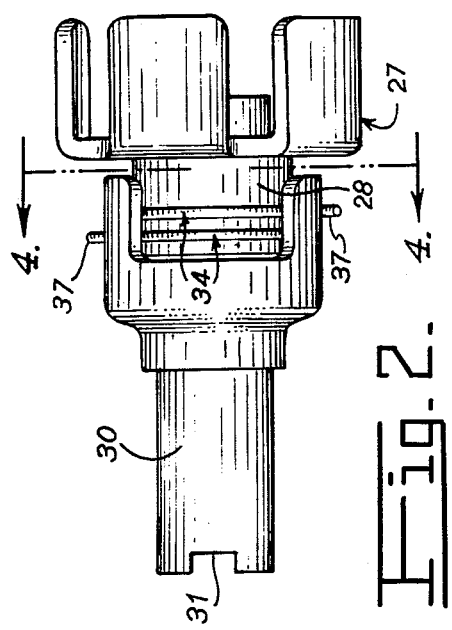
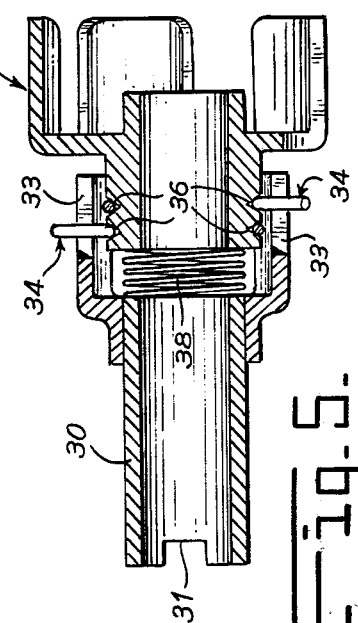

FREE-WHEELING MECHANISM FOR BICYCLES

BACKGROUND OF THE INVENTION

Up to the present, the various so-called free-wheeling or coasting mechanisms for bicycles have sought to allow the wheels to continue turning when the pedals are stopped. That is, to find the solution to the overlasting problem of achieving a mechanism which will permit the power transmitting elements to stand still when no long activated while the wheel continues to turn.

The free-wheeling mechanisms which are known at the present have not succeeded in providing effective free wheeling, because they include a series of parts subject to constant friction and therefore act as a drag. In general, these include the integral brake the braking portion of which may be one having three dragging elements such as the balls which provide engagement to the sprocket on which the chain is connected, the brake ratchets which continuously rub against the brake mechanism, and the tension action of the chain. Again, it may be the so-called backpedalling brake and free pinion, which in itself produces a continuous rubbing which precludes true free wheeling.

Furthermore, with the known types of free wheeling mechanisms it is necessary to go to a shop to change the spokes and sprocket to obtain speed-changing elements. It is also necessary to provide a longer pedal spindle to maintain the alignment with the sprockets, and in some cases the frames must also be modified.

OBJECTS OF THE INVENTION

Accordingly, it it one object of this invention to provide improvements in a free-wheeling mechanism for bicycles by means of which when pedalling is suspended, as for example to rest or when going downhill, the wheel is disconnected from the rest of the mechanism and remains wholly free and accordingly provides more travel with less effort. In addition since the wheel is totally disconnected, the free wheeling mechanism is totally silent.

In addition the mechanism of the present invention is easily disassembled. With a screwdriver the sprockets are easily taken off and there is no need to go to a shop to change the spokes. Also, the free wheeling mechanism of the present invention may be used with a three speed mechanism, since it maintains alignment with the pedal sprocket with no need to provide a longer spindle therein, nor to modify the frame, and using the same chain with master link.

Another important advantage of the free wheeling mechanism of this invention is that any speed shifting mechanism can be used, and also the traditional brakes can be used, either hand-operated rod or cable brakes or those which bear against the rim upon back-pedalling.

Accordingly, the free wheeling mechanism of the present invention consists of two fixed cones and one movable cone mounted on an axle, and so constructed as to partially provide raceways in which balls run; the movable cone at one of its ends has a slotted head in which are supported rollers guided by a suitable device, which is also mounted on the axle; a hub which houses the foregoing parts except for the end portion of the movable cone opposite the end with the slotted head; and holding means of the guide device which are such as to allow the guide device to compel the rollers to make contact with the hub, or to prevent them from doing so, according to whether the wheel is to run in engagement or to coast without pedalling.

These and other objects to be obtained in the application of this invention will be more clearly understood and appreciated in the reading of the following description, which refers to the drawings of the preferred embodiment of the present invention.

BRIEF DESCRIPTION OF THE DRAWINGS

FIG. 2 is a view in vertical elevation from the side showing the guide device and the holding means thereof.

FIG. 3 is a view facing the end shown in FIG. 2, and shows with broken lines the position of the rollers.

FIG. 4 is a view in cross section taken along line 4—4 of FIG. 2.

FIG. 5 is a view in lengthwise conventional cross section of the parts shown in FIG. 2.

DETAILED DESCRIPTION OF THE INVENTION

Figure 1:
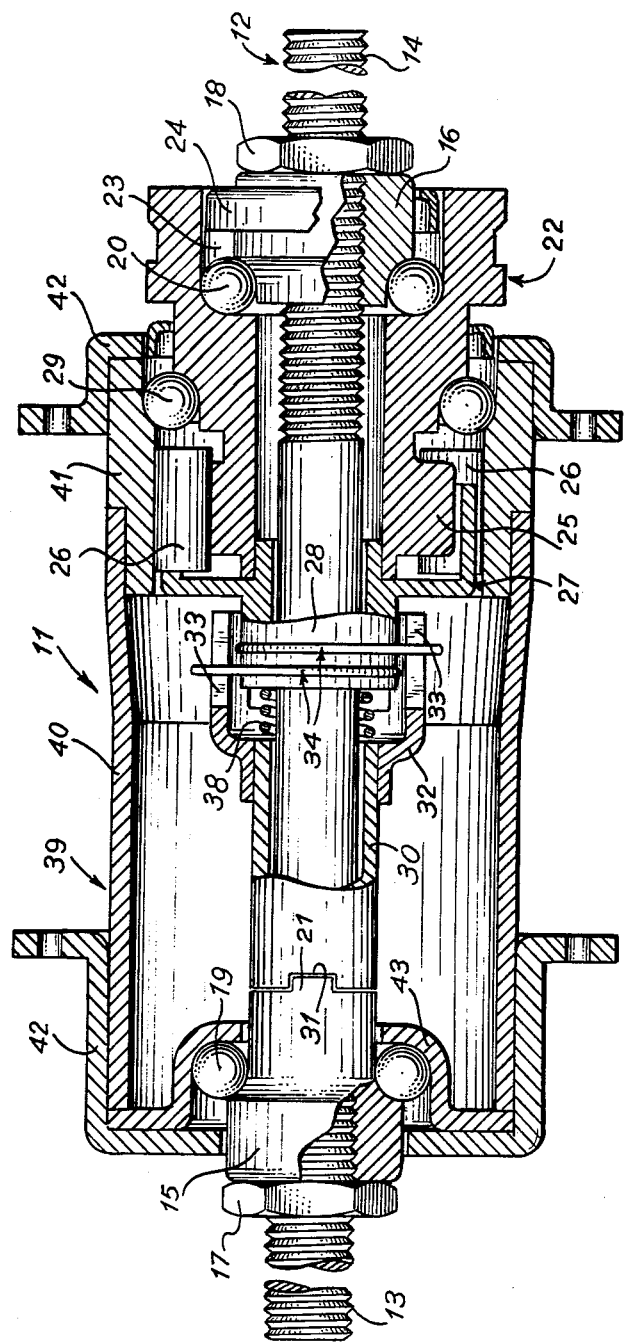
FIG. 1 is a view in conventional lengthwise cross section illustrating the free wheeling mechanism of the present invention and showing partially broken the fixed cones and the holding means of the guide device.

The present invention refers to mechanisms which permit free rotation of wheels and more specifically to improvements in a free wheeling mechanism 11 for bicycles, which is composed of an axle 12 threaded at its end portions 13 and 14, so that fixed cones 15 and 16 can be mounted thereon and held stationary by means of locknuts 17 and 18, which bear against one end of fixed cones 15 and 16.

The ends of fixed cones 15 and 16 opposite to the ends in contact with the locknuts 17 and 18, are so shaped as to provide partial raceways for a series of balls 19 and 20. The raceway end of fixed cone 15 is elongated and carries tabs or projections 21 on its edge.

On end portion 14 of axle 12 there is freely mounted a movable cone 22 having a portion of its end so shaped externally as to permit the attachment of the bicycle sprockets, and internally it includes a recess 23 in which the fixed cone 16 is housed, and which forms the second partial raceway for the series of balls 20. Shell 24 is provided to keep the housing recess 23 completely covered.

The opposite end portion of movable cone 22 is shaped in the form of a slotted head 25 which in cross-section is made up of sloping planes which provide an inclined runway for rollers 26 which are supported in and slide on these inclined planes. Thus, when the movable cone 22 rotates in one direction or the other, i.e. the bicycle is pedalled forwards or backwards, rollers 26 are either compelled or not to press outwardly through slots in a guide device 27 which holds them; this guide device 27 is also mounted on the axle 12 by means of an annular portion 28. The intermediate portion of movable cone 22 is so shaped as to provide on its outer surface part of a raceway for balls 29.

Guide device 27 is held by means of suitable elements which allow it to maintain the required position so that rollers 26 may press out of the slots or not when movable cone 22 turns or remains stationary, that is, when the bicycle is being pedalled or when pedalling stops.

These holding means are essentially the improvements of the present invention, and comprise a sleeve 30 connected securely to the axle 12 by means of slots 31 engaged in projections 21 of fixed cone 15, whereby sleeve 30 is maintained in a fixed position. The opposite end of sleeve 30 has attached to it, a cup 32 which surrounds the annular portion 28 of guide device 27. Cup 32 has diametrically opposed slots 33 which are cut diagonally to the cross section of cup 32; and cup 32 is connected with annular portion 28 by means of clamps 34 which engage the said diagonal slots 33, and which permit guide device 27 to turn only in a single direction on axle 12.

Clamps 34 are each shaped in the manner of a spiral 35 surrounding annular portion 28 and are engaged thereto by means of annular grooves 36 having a V-shaped channel; each spiral 35 has one end 37 bent at an angle, which engages slots 33 by extending therethrough. Accordingly, if guide device 27 tries to rotate in a direction toward end 37, spiral 35 will open and permit such rotation of the guide device 27; however, if it attempts to rotate in the direction opposite to end 37, spiral 35 is forced to close, strongly seizing guide device 27 and preventing it from rotating.

In addition and purely for manufacturing purposes, helical spring 38 mounted on axle 12 is placed between sleeve 30 and annular portion 28. This spring 38 biases sleeve 30 to keep it permanently engaged with cone 15, and to keep guide device 27 in contact with movable cone 22, thus keeping rollers 26 always adequately supported.

All of the parts above mentioned, with the exception of that portion of movable cone 22 which includes recess 23, are housed within a hub 39, which is composed of two tubular portions 40 and 41 which can be assembled together to form a single tubular piece, and of plates 42 for mounting the spokes, these plates 42 end at the two end portions of the tubular piece.

Finally, the free wheeling mechanism is completed with a cup 43 surrounding the threaded portion 13 and held by the end of the hub 39 and by the corresponding spoke supporting plate 42; said cup 43 constitutes the remaining portion of the raceway for group of balls 19.

The functioning of the mechanism of the present invention is very simple. Pedalling transmits, through the corresponding transmission means, the power or torque to the movable cone 22, and the latter compels rollers 26 to extend outward through the slots of guide device 27 and to make contact with hub 39, forcing it and hence the wheel as well, to turn.

Now then, when pedalling is interrupted cone 22 is immobilized, but nevertheless the wheel continues to rotate freely because hub 39 will be free of contact with rollers 26, because, due to inertia, guide device 27 will continue to rotate the required fraction of a turn in the direction permitted by the holding means, and will place rollers 26 at the lowest part of the inclined planes of slotted head 25, thus preventing them from extending out through the slots of said guide device 27, hence achieving true free wheeling with no drag and providing the advantages above mentioned.

While the foregoing description has been given in relation to a specific embodiment of the invention, it will be clear to all persons expert in this subject matter that changes in form and detail are comprehended in the scope and sprit of the invention.

I claim:

1. A free wheeling mechanism for a bicycle comprising an axle; first and second fixed bearing cones mounted on respective end portions of said axle; a movable cone formed with a recess accommodating said first cone, said movable cone and said first fixed cone defining a first raceway; a hub through which said axle extends and which surrounds said second fixed cone and said movable cone, said hub and said second fixed cone defining a second raceway and said hub and said movable cone defining a third raceway; ball bearings running in said raceways, whereby the movable cone is rotatable with respect to the axle and the hub is rotatable with respect to both the axle and the movable cone; rollers positioned between the movable cone and the hub and displaceable between a position in which they couple the movable cone to the hub and a position in which they do not couple the movable cone to the hub; a guide device for retaining said rollers between the movable cone and the hub, said guide device having an annular portion defining an opening through which the axle extends; holding means having a sleeve mounted on the axle with one end coupled to one of said fixed cones, a cup fixed to the other end of the sleeve, which cup houses the annular portion of said guide device, and resilient connecting means for connecting said cut with said annular portion; and a helical spring urging the annular portion of said guide device towards the movable cone.

2. A mechanism as claimed in claim 1, wherein said sleeve is keyed to said one fixed cone and is displaceable along the axle out of keying engagement with said one fixed cone, and said helical spring urges the sleeve into engagement with said one fixed cone.

3. A mechanism as claimed in claim 1, wherein said cup is formed with diametrically opposed slots which extend through the wall of the cup obliquely with respect to the diameter joining said slots, and wherein said connecting means comprise first and second clamps, each shaped as a spiral extending around said annular portion and having a bent end portion extending through one of said slots.

4. A mechanism as claimed in claim 3, wherein said annular portion of the guide device is formed with annular, V-shaped grooves in which said spirals are mounted.

* * * * *